(No Model.)
J. S. McKAY.
ANIMAL TRAP.
No. 371,693. Patented Oct. 18, 1887.
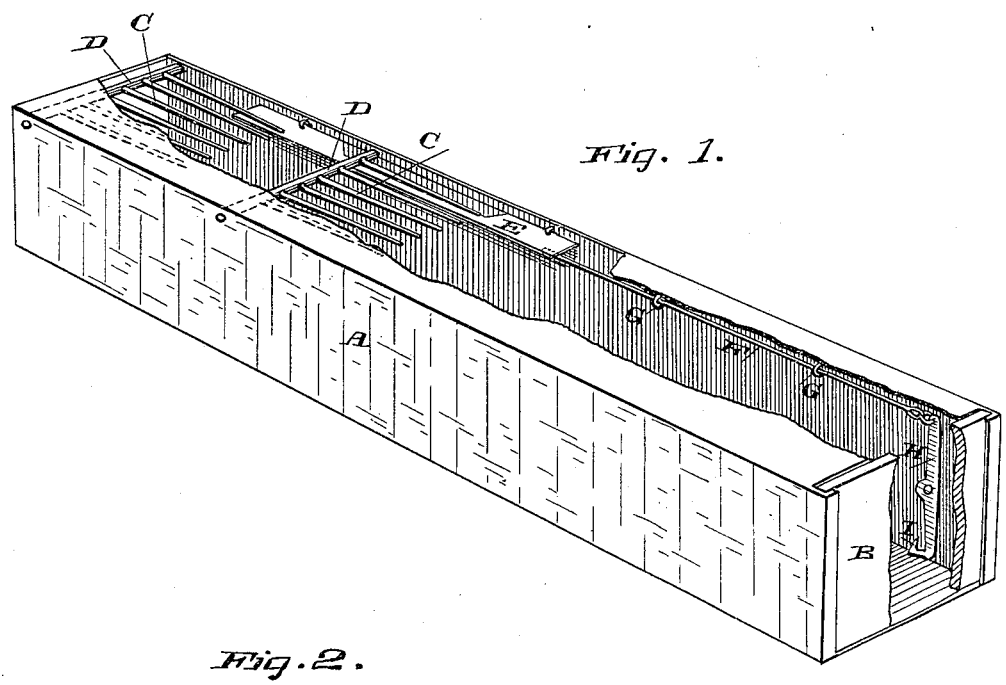
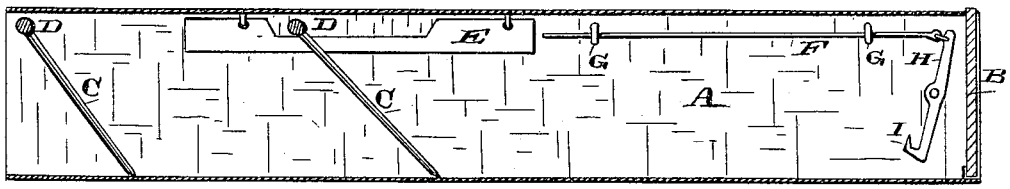
Witnesses:
Geo. H. Strong.
Inventor,
Jas. S. McKay
By Dewey & Co.
Attys

UNITED STATES PATENT OFFICE.

JAMES S. McKAY, OF BIG OAK FLAT, ASSIGNOR OF ONE-HALF TO A. W. McLEAN, OF SAN FRANCISCO, CALIFORNIA.

ANIMAL-TRAP.

SPECIFICATION forming part of Letters Patent No. 371,693, dated October 18, 1887.

Application filed June 4, 1887. Serial No. 240,338. (No model.)

*To all whom it may concern:*

Be it known that I, JAMES S. MCKAY, of Big Oak Flat, county of Tuolumne, State of California, have invented an Improvement in Animal-Traps; and I hereby declare the following to be a full, clear, and exact description of the same.

My invention relates to an improved trap for animals of every description. It is especially useful, however, for that class of vermin, such as gophers, rats, mice, &c.

It consists of a long box or inclosure having at one end a grated or light glazed space and at the opposite end two or more gates made in the form of gratings, which are hinged at the top, and, in connection with this, of a setting device by which the gates may be kept open until the bait at the inner end is disturbed by the approaching animal.

Referring to the accompanying drawings for a more complete explanation of my device, Figure 1 is a perspective view of my apparatus. Fig. 2 is a longitudinal section of the same.

A is an exterior case or inclosure of considerable length, having one end closed, or grated opening B, which allows light to pass through, but which will prevent the escape in that direction of any animal. Near the opposite end and a short distance apart are hinged two gates, C C. The hinges of these gates are at or near the upper part of the case, and the gates may be made in any suitable form. In the present case I have shown them made of stout iron or wire bars or rods standing parallel with each other and sufficiently near to prevent the escape of any animal between them.

The upper ends are fixed in the hinged bars D, and the lower ends are pointed, and the gates are made long enough so that when the lower ends rest upon the floor of the inclosure they stand at a considerable incline, so that it will be impossible to raise them or pass by them. These two gates make the cage additionally safe, because if an animal should by any accident succeed in passing the first one, he would still be kept in by the second, and his efforts would be directed to the one which would rise the easiest, so that he would eventually find his way back again into the main part of the trap. When it is desired to open these gates for the ingress of animals to be entrapped, they are raised so as to lie in a horizontal position, as shown in Fig. 1, and are supported by means of a plate, E, which has one edge hinged to the side of the trap, and is sufficiently long so that when turned up horizontally its free edge is beneath the two nearest teeth or the edges of the two gates, thus keeping them up close to and parallel with the top of the trap. This plate E is held up by means of a rod, F, which passes through guides or staples G upon the side of the trap, and while one end lies beneath the plate E, so as to hold it in a horizontal position, the other end is connected with a lever, H, fulcrumed at some convenient point at or near the closed end of the trap. The lower end of this lever is provided with a means for holding the bait, as shown at I, so that when the animal enters the trap, attracted by the bait, he will pass below the gates, and, pulling up the bait, will move the lever H, and thus draw the rod F backward, so as to release the hinged piece E and allow it to fall down parallel with the side to which it is hinged. This releases the two gates C C, which immediately drop with their points upon the floor of the trap and prevent the escape of the inmate.

Having thus described my invention, what I claim as new, and desire to secure by Letters Patent, is—

1. The trap consisting of the box or inclosure having two or more gates hinged near the entrance end and at a distance apart, said gates being capable of opening about hinges in the upper part of the trap, or closing so that their lower edges rest upon the floor, the gates standing at an incline, in combination with a hinged plate or board which engages one side of each of the gates when turned up beneath them after they are opened, and the rod by which the board is held in place when the trap is set, substantially as described.

2. A trap consisting of a box having the gates hinged in the upper part near the entrance end, the hinged board E, whereby the gates are held up when open, the rod F, which engages the hinged board, and the lever H, connected with the said rod at one end and arranged to hold the bait at the opposite end, substantially as described.

In witness whereof I hereunto set my hand.

JAMES S. McKAY.

Witnesses:
S. H. NOURSE,
H. C. LEE.